United States Patent
Yano

(10) Patent No.: US 9,338,335 B2
(45) Date of Patent: May 10, 2016

(54) LENS DRIVE APPARATUS, LENS BARREL TO WHICH THE LENS DRIVE APPARATUS IS APPLIED, AND IMAGE PICKUP APPARATUS

(71) Applicant: OLYMPUS CORPORATION, Shibuya-ku, Tokyo (JP)

(72) Inventor: Tomohide Yano, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/285,443

(22) Filed: May 22, 2014

(65) Prior Publication Data

US 2015/0062408 A1    Mar. 5, 2015

(30) Foreign Application Priority Data

Aug. 30, 2013   (JP) .................................. 2013-180117

(51) Int. Cl.
  *G03B 3/10*   (2006.01)
  *H04N 5/225*  (2006.01)
  *G02B 7/10*   (2006.01)

(52) U.S. Cl.
  CPC .............. *H04N 5/2253* (2013.01); *G02B 7/102* (2013.01)

(58) Field of Classification Search
  USPC ......................................................... 396/133
  See application file for complete search history.

(56) References Cited

U.S. PATENT DOCUMENTS

| 7,412,160 | B2 * | 8/2008 | Nakanishi | G02B 7/102 359/824 |
| 7,702,233 | B2 * | 4/2010 | Oh | G02B 7/102 359/824 |
| 2007/0133973 | A1 * | 6/2007 | Nishikawa | G02B 7/102 396/133 |
| 2007/0274699 | A1 * | 11/2007 | Chuang | G03B 13/34 396/133 |
| 2008/0075446 | A1 * | 3/2008 | Utz | G02B 7/102 396/133 |

FOREIGN PATENT DOCUMENTS

JP      2013-037042 A    2/2013

* cited by examiner

*Primary Examiner* — Clayton E Laballe
*Assistant Examiner* — Dennis Hancock
(74) *Attorney, Agent, or Firm* — Holtz, Holtz & Volek PC

(57) ABSTRACT

A lens drive apparatus includes a yoke which has a first parallel portion parallel to an optical axis and a second parallel portion which is located closer to the optical axis than the first parallel portion, the first and the second parallel portions being magnetically coupled, a magnet arranged at the first parallel portion to extend in the optical axis direction, a first lens frame which has a first coil wound around the second parallel portion and which is guided by a first guide shaft, and a second lens frame, which has a second coil wound around the second parallel portion and which is guided by a second guide shaft, and the first and the second guide shafts are arranged at positions so as not to interfere with the yoke in a cross-section perpendicular to the optical axis.

5 Claims, 12 Drawing Sheets

LENS DRIVE APPARATUS, LENS BARREL TO WHICH THE LENS DRIVE APPARATUS IS APPLIED, AND IMAGE PICKUP APPARATUS

CROSS REFERENCE TO RELATED APPLICATION

This application claims the benefit of Japanese Application No. 2013-180117 filed in Japan on Aug. 30, 2013, the contents of which are incorporated herein by this reference.

BACKGROUND OF THE INVENTION

1. Field of the Invention

The present invention relates to a structure of a lens drive apparatus which moves each of a plurality of movable lenses included in a photographing optical system in an optical axis direction using voice coil motor mechanisms in a lens barrel of an image pickup apparatus.

2. Description of the Related Art

Conventionally, photographing apparatuses, for example image pickup apparatuses such as digital cameras and video cameras, have been generally put into practical use and widely spread, which are provided with image display apparatuses such as liquid crystal display (LCD) apparatuses that sequentially convert optical images formed by photographing optical systems into image signals using photoelectric conversion devices, or the like, record resulting image signals in recording media as image data in a predetermined format and reproduce and display the image data recorded in the recording media as images.

Such an image pickup apparatus includes a lens barrel which is configured to have a photographing optical system comprised of a plurality of optical lenses, or the like, a plurality of holding members for respectively holding the respective optical lenses, and a lens drive apparatus, or the like for moving movable lens holding members which are part of the plurality of holding members, forward and backward in an optical axis direction. As a structure of the lens barrel, there is, for example, a structure in which the movable lens holding member moves forward and backward in the optical axis direction along a pair of shaft members (a guide shaft and an anti-rotation shaft) arranged in parallel to the optical axis.

In regard to the lens driving apparatuses applied to the lens barrels of the conventional image pickup apparatuses, in recent years, various lens drive apparatuses which employ voice coil motors (VCM) as driving mechanisms have been proposed in, for example, Japanese Patent Application Laid-Open Publication No. 2013-37042. Use of a voice coil motor mechanism as a driving mechanism of a lens drive apparatus advantageously contributes to higher-speed movement of a movable lens holding member.

SUMMARY OF THE INVENTION

A lens drive apparatus according to one aspect of the present invention includes a yoke which has a first parallel portion parallel to an optical axis in a cross-section in an optical axis direction and a second parallel portion which is located closer to the optical axis than the first parallel portion in the cross-section in the optical axis direction and which is parallel to the optical axis, the first parallel portion and the second parallel portion being magnetically coupled, a magnet arranged at the first parallel portion of the yoke to extend in the optical axis direction so that a cross-section in the optical axis direction is parallel to the optical axis, a first lens frame which has a first coil wound around the second parallel portion of the yoke and which is guided by a first guide shaft, and a second lens frame which is arranged at a predetermined distance from the first lens frame, which has a second coil wound around the second parallel portion of the yoke, and which is guided by a second guide shaft, and the first guide shaft and the second guide shaft are arranged at positions so as not to interfere with the yoke in a cross-section perpendicular to the optical axis.

Advantages of the present invention will become further clear with the following detailed description.

DETAILED DESCRIPTION OF THE PREFERRED EMBODIMENT

Figure 1:
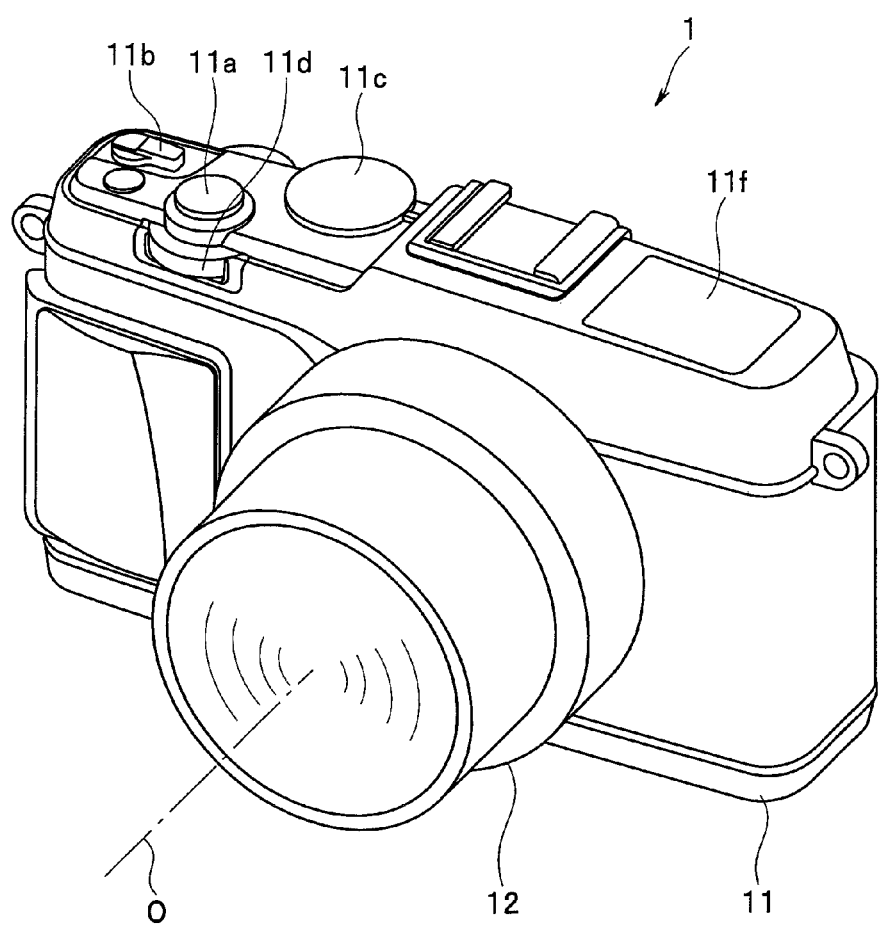
FIG. 1 is an exterior perspective view illustrating one form of an image pickup apparatus (camera) provided with a lens barrel to which a lens drive apparatus according to one embodiment of the present invention is applied.

The present invention will be described below using the illustrated embodiment. One embodiment of the preset invention illustrates a case where the present invention is applied to a lens drive apparatus in a lens barrel of an image pickup apparatus, for example, an image pickup apparatus such as a digital camera and a video camera (hereinafter, simply referred to as a "camera"), the image pickup apparatus being configured to sequentially convert optical images formed through a photographing optical system configured with, for example, a plurality of optical lenses into image signals using photoelectric conversion devices, or the like, convert the resulting image signals into digital image data which represents still images or movies, record the generated digital data in a recording medium, and reproduce and display the still images or the movies using an image display apparatus such as a liquid crystal display (LCD) apparatus based on the digital image data recorded in the recording medium.

In the present embodiment, the optical axis of the photographing optical system in the lens barrel is expressed with a reference code O. In a direction along the optical axis O, a side of an object which faces a front face of the camera will be referred to as front, while a side of a light receiving face (image forming face) of an image pickup device arranged at a back side of the camera will be referred to as backward.

Note that in the respective drawings used for the following description, scales may be different among the respective components in order to make the respective components recognizable in the drawings. Accordingly, the number of components, shapes of the components, size ratios of the components and a relative positional relationship among the respective components of the present invention illustrated in the drawings are not limited to those in the form illustrated in the drawings.

Figure 2:
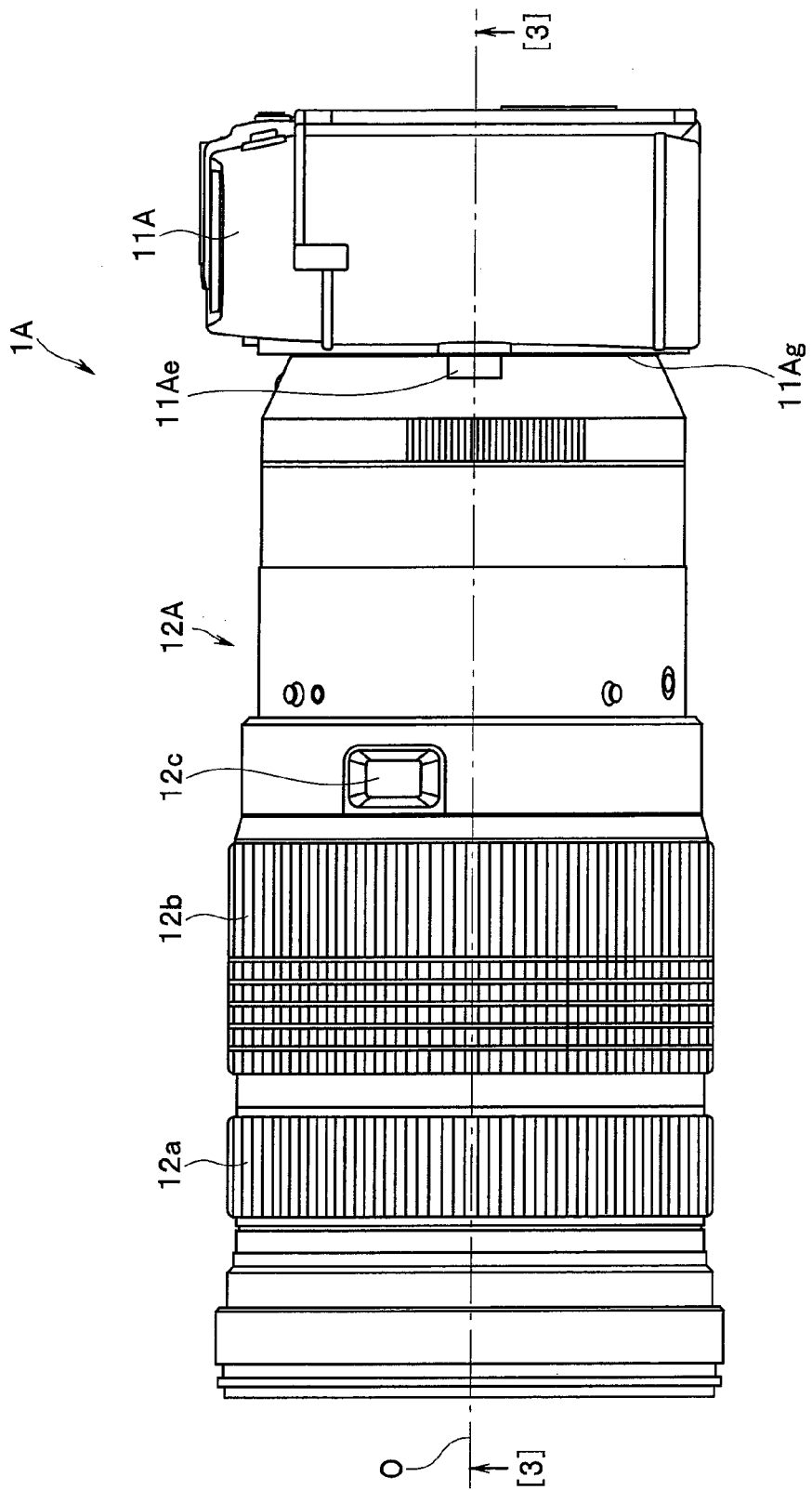
FIG. 2 is a side view illustrating another form of the image pickup apparatus (camera), which is different from the form of FIG. 1.

First, before a detailed configuration of the lens drive apparatus according to one embodiment of the present invention is described, a schematic configuration of the image pickup apparatus (camera) provided with the lens barrel to which the lens drive apparatus is applied will be described below. FIG. 1 is an exterior perspective view illustrating one form of the image pickup apparatus (camera) provided with the lens barrel to which the lens drive apparatus according to one embodiment of the present invention is applied. FIG. 2 is a side view illustrating another form of the image pickup apparatus (camera) which is different from the form of FIG. 1.

The lens drive apparatus of the present invention can be respectively applied to both of the lens barrel of the camera in the form as illustrated in FIG. 1 in which, for example, the lens barrel is integrally configured in a camera body and the lens barrel of the camera in the form as illustrated in FIG. 2 in which the lens barrel is configured so as to be freely attached to and removed from a camera body.

FIG. 1 illustrates a camera 1 in the form in which a lens barrel 12 is integrally configured with a camera body 11 as described above.

The camera body 11 which is shaped in a flat box, is a chassis portion configured to store electronic parts, or the like (not shown) including an image pickup device, a control circuit and various electric circuits, and other various configuration units (such as a pop-up type flash light emitting apparatus 110 inside. Though not illustrated in FIG. 1, for example, an image display apparatus and various operating members are arranged at a back side of the camera body 11. Further, various operating members are provided on an upper face of the camera body 11. Such operating members include, for example, a shutter release button 11a, a power ON/OFF lever 11b, a mode switch dial 11c and a zoom lever 11d.

At the front face of the camera body 11, the lens barrel 12 is integrally arranged. The lens barrel 12 is configured to have a photographing optical system comprised of, for example, a plurality of optical lenses, a plurality of holding members for respectively holding the plurality of optical lenses configuring the photographing optical system, a lens drive apparatus for moving (a plurality of) movable lens holding members which are part of the plurality of holding members, forward and backward in the optical axis O direction, a control circuit for controlling components at a side of the lens barrel 12, an electric circuit, or the like.

At the camera 1 in the form illustrated in FIG. 1, the lens barrel 12 is driven and controlled using a plurality of operation members provided at a side of the camera body 11. For example, when the shutter release button 11a is depressed, a control circuit (not shown) within the camera body 11 drives and controls configuration units such as an image pickup device, within the camera body 11, and controls the lens drive apparatus at the side of the lens barrel 12 to perform autofocus operation or controls a diaphragm apparatus and a shutter apparatus in the lens barrel 12 to execute exposure operation. Further, when the zoom lever 11d is operated, the operation members control a drive apparatus at the side of the lens barrel 12 to execute electric zooming operation.

In contrast to FIG. 1, FIG. 2 illustrates a camera 1A in a form in which a lens barrel 12A is configured so as to be freely attached to and removed from a camera body 11A.

The camera body 11A which is shaped in a flat box in substantially the same manner as the camera body 11 in the form of FIG. 1, is a chassis portion configured to store various electric parts, or the like (not shown) inside including an image pickup device and various configuration units. Because the other components are substantially the same as those of the camera body 11 in the form in FIG. 1, detailed explanation will be omitted and only different parts will be described below.

In the camera 1A in the form illustrated in FIG. 2, a mount portion 11Ag which is a lens connection portion for enabling the lens barrel 12A to be freely attached to and removed from a front face of the camera body 11A is provided. The camera body 11A and the lens barrel 12A are integrally coupled to configure the camera 1A by a lens mount 20 (not shown in FIG. 2, see FIG. 3 which will be described later) of the lens barrel 12A being coupled to the mount portion 11Ag by bayonet engagement. The coupling state of the coupled camera body 11A and lens barrel 12A are released by a lens release button 11Ae provided at the front face of the camera body 11A.

Further, electric contacts are respectively provided at the mount portion 11Ag at the side of the camera body 11A and at the lens mount 20 at the side of the lens barrel 12A, which are configured to be electrically connected when the camera body 11A and the lens barrel 12A are mechanically coupled as described above. Accordingly, when the camera body 11A and the lens barrel 12A are coupled, a control circuit at the side of the camera body 11A communicates with a control circuit at the side of the lens barrel 12A to perform necessary control in cooperation with each other.

The lens barrel 12A which is formed with a tubular member as a whole, is configured to have a photographing optical system comprised of, for example, a plurality of optical lenses, a plurality of holding members for respectively holding the plurality of optical lenses configuring the photographing optical system, a lens drive apparatus for moving (a plurality of) movable lens holding members which are part of the plurality of holding members, forward and backward in the optical axis O direction, a control circuit for controlling components at the side of the lens barrel 12A, an electric circuit, or the like, inside in substantially the same manner as the camera 1 in the form of FIG. 1. A plurality of operating members are provided at an outer face of the lens barrel 12A. As the operating members in the lens barrel 12A, in addition to two ring-shaped members (a focus ring 12a and a zoom ring 12b) which are provided to be able to freely rotate around the optical axis O, for example, one pressed type operation button 12c is provided. This operation button 12c is an operation member for giving an instruction to execute functions arbitrarily assigned by a user among predetermined functions. The function which can be assigned to the operation button 12c includes, for example, a function for switching between an autofocus mode (AF mode) and a manual focus mode (MF mode), a stop down function (preview function), a function for switching to a macro photographing mode.

The configuration in which the zoom ring 12b is provided at the camera 1A in the form of FIG. 2 allows the user to perform zoom operation by manually turning the zoom ring 12b. Accordingly, in the camera body 11A of the camera 1A in the form of FIG. 2, the zoom lever 11d can be omitted among the operating members provided at the side of the camera body 11 of the above-described camera 1 in the form of FIG. 1. Note that the camera 1A in the form of FIG. 2, when being configured to electrically perform zoom operation, can be also configured to be able to perform zoom operation of the lens barrel 12A using an operating member (operating member corresponding to the zoom lever 11d in FIG. 1) at the side of the camera body 11A. Also in this case, by configuring the zoom ring 12b at the side of the lens barrel 12A as a switch member, it is also possible to perform zoom operation by manually using the zoom ring 12b.

Further, when the user manually turns the focus ring 12a, control for enabling manual focus operation is performed. Other drive control (such as autofocus operation and exposure operation) of the lens barrel 12A in the camera 1A in the form shown in FIG. 2 is performed mainly using the plurality of operating members at the side of the camera body 11A in substantially the same manner as the above-described camera 1 in the form in FIG. 1.

The detailed configuration of the lens barrel to which the lens drive apparatus according to one embodiment of the present invention is applied will be described below. Note that in the following description, the detailed configuration inside the lens barrel 12A which can be mounted to the above-described camera 1A in the form in FIG. 2 will be described as an example. The basic configuration can be also applied to the lens barrel 12 of the camera 1 in the form of FIG. 1 in substantially the same manner.

Figure 3:
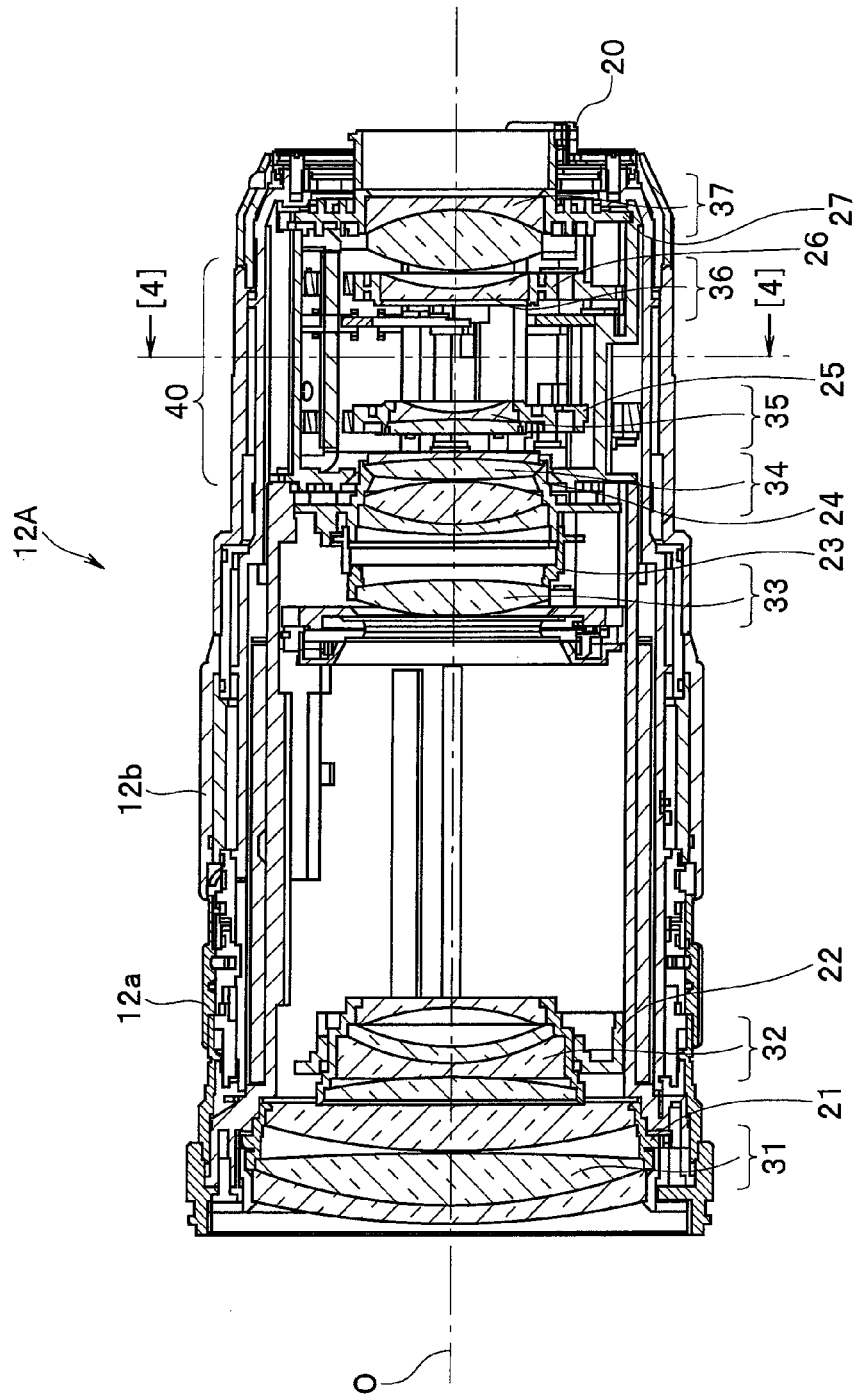
FIG. 3 is a cross-sectional view which illustrates a cross-section of an overall lens barrel of the image pickup apparatus (camera) in the form of FIG. 2, and which is cut along a line [3]-[3] (optical axis O) in FIG. 2.

FIG. 3 illustrates a vertical cross-sectional view of an overall lens barrel of the camera in the form of FIG. 2, which is a cross-sectional view cut along a line [3]-[3] (the optical axis O) in FIG. 2.

As illustrated in FIG. 3, the lens barrel 12A is configured with a plurality of optical lens groups (31, 32, 33, 34, 35, 36, 37) configuring a photographing optical system, lens holding members (21, 22, 23, 24, 25, 26, 27) for respectively holding the plurality of optical lens groups, other fixing members, frame members, or the like configured to fix the lens holding members at respective predetermined positions or allow the lens holding members to move forward and backward in a direction along the optical axis O or to rotate around the optical axis O, and a lens drive apparatus 40, or the like for moving movable lens holding members (25, 26) among the lens holding members forward and backward in the direction along the optical axis O.

The plurality of optical lens groups are a first group lens 31, a second group lens 32, a third group lens 33, a fourth group lens 34, a fifth group lens 35, a sixth group lens 36 and a seventh group lens 37 in this order from the front. The plurality of lens holding members are a first group lens holding frame 21 for holding the first group lens 31, a second group lens holding frame 22 for holding the second group lens 32, a third group lens holding frame 23 for holding the third group lens 33, a fourth group lens holding frame 24 for holding the fourth group lens 34, a fifth group lens holding frame 25 for holding the fifth group lens 35, a sixth group lens holding frame 26 for holding the sixth group lens 36 and a seventh group lens holding frame 27 for holding the seventh group lens 37 in this order from the front. Among these lens holding frames, the second group lens holding frame 22 is a movable lens holding member for holding a zoom lens group (second group lens 32) which contributes to zooming. Further, the fifth group lens holding frame 25 and the sixth group lens holding frame 26 are movable lens holding members for holding focus lens groups (35, 36) which contribute to focusing. The lens drive apparatus 40 according to the present embodiment acts on the above-described two movable lens holding members (25, 26). Note that in the lens barrel according to the present embodiment, the other lens holing members are fixed lens holding members.

Further, the lens barrel 12A has a manual zoom mechanism which performs zoom operation by moving the second group lens holding member 22 holding the optical lens group 32 which contributes to zooming in a direction along the optical axis O by the user manually turning the zoom ring 12b. Because a configuration of the manual zoom mechanism is not directly related to the present invention, the detailed description will be omitted assuming that a conventionally typical zoom mechanism is employed. Further, the detailed description of the other components in the configuration of the lens barrel 12A will be omitted assuming that, basically, the lens barrel 12A has substantially the same components as those in the zoom lens barrel of the conventionally typical mode.

Figure 4:
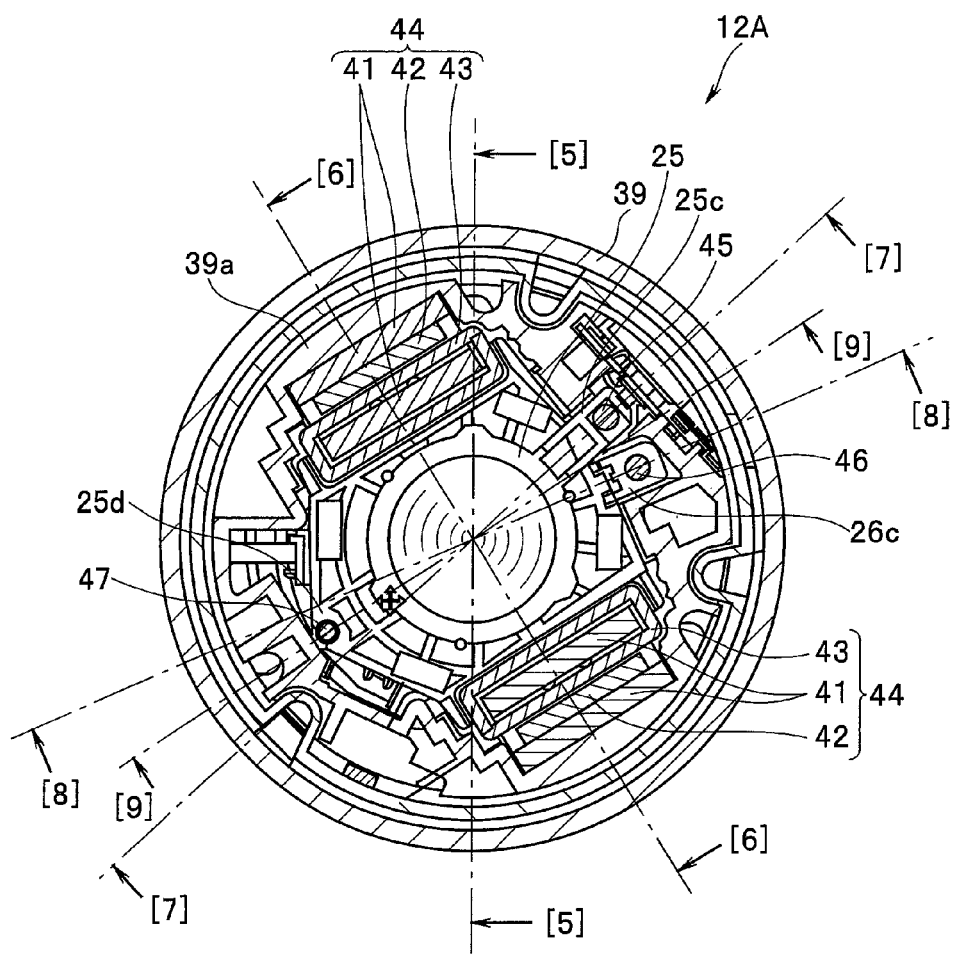
FIG. 4 is a cross-sectional view which illustrates a cross-section of a face orthogonal to the optical axis O near the lens drive apparatus according to one embodiment of the present invention, and which is cut along a line [4]-[4] in FIG. 3.
Figure 5:
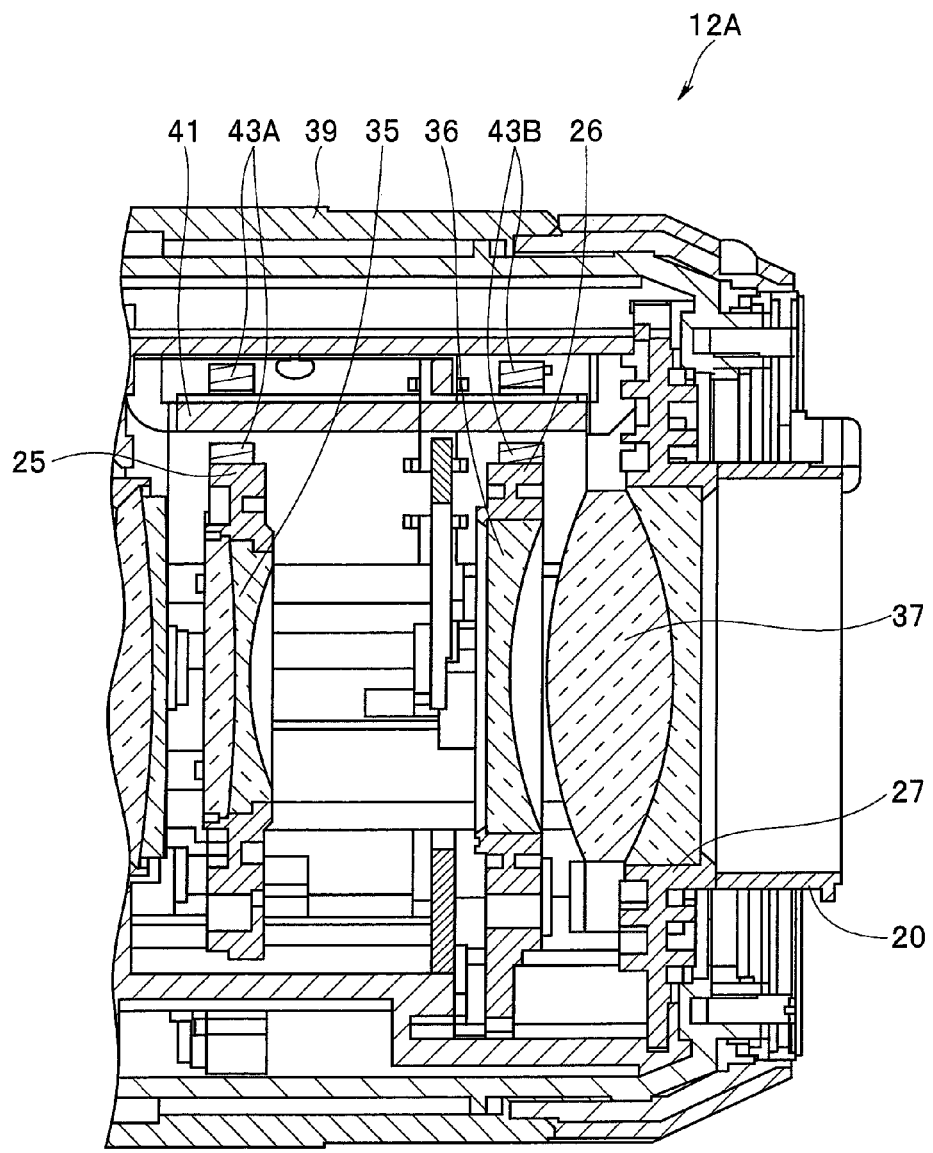
FIG. 5 is a cross-sectional view in which part of FIG. 3 is enlarged, and which is cut along a line [5]-[5] in FIG. 4.
Figure 6:
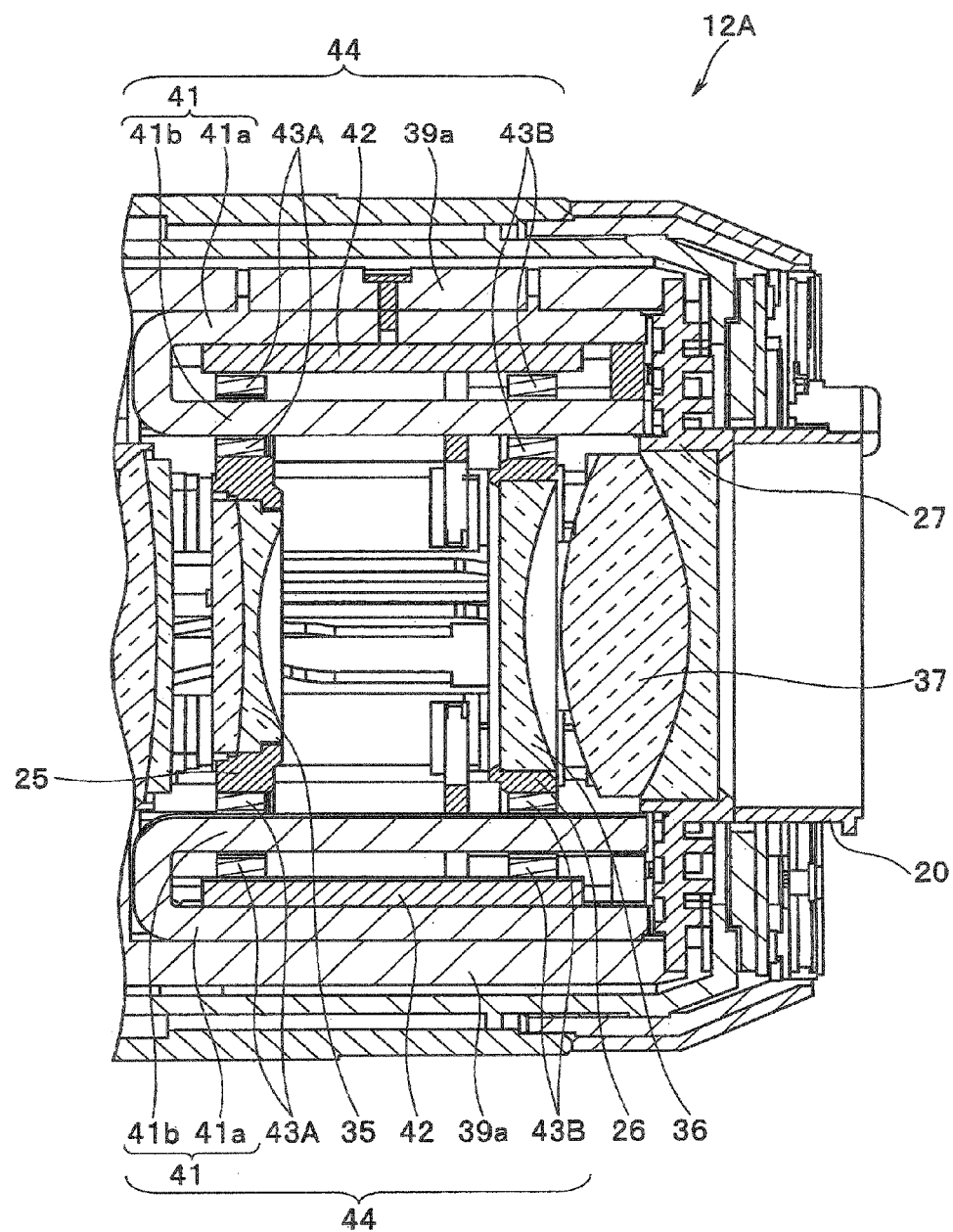
FIG. 6 is a cross-sectional view which illustrates a cross-section of a yoke of a voice coil motor mechanism in the lens drive apparatus according to one embodiment of the present invention, and which is cut along a line [6]-[6] in FIG. 4.
Figure 7:
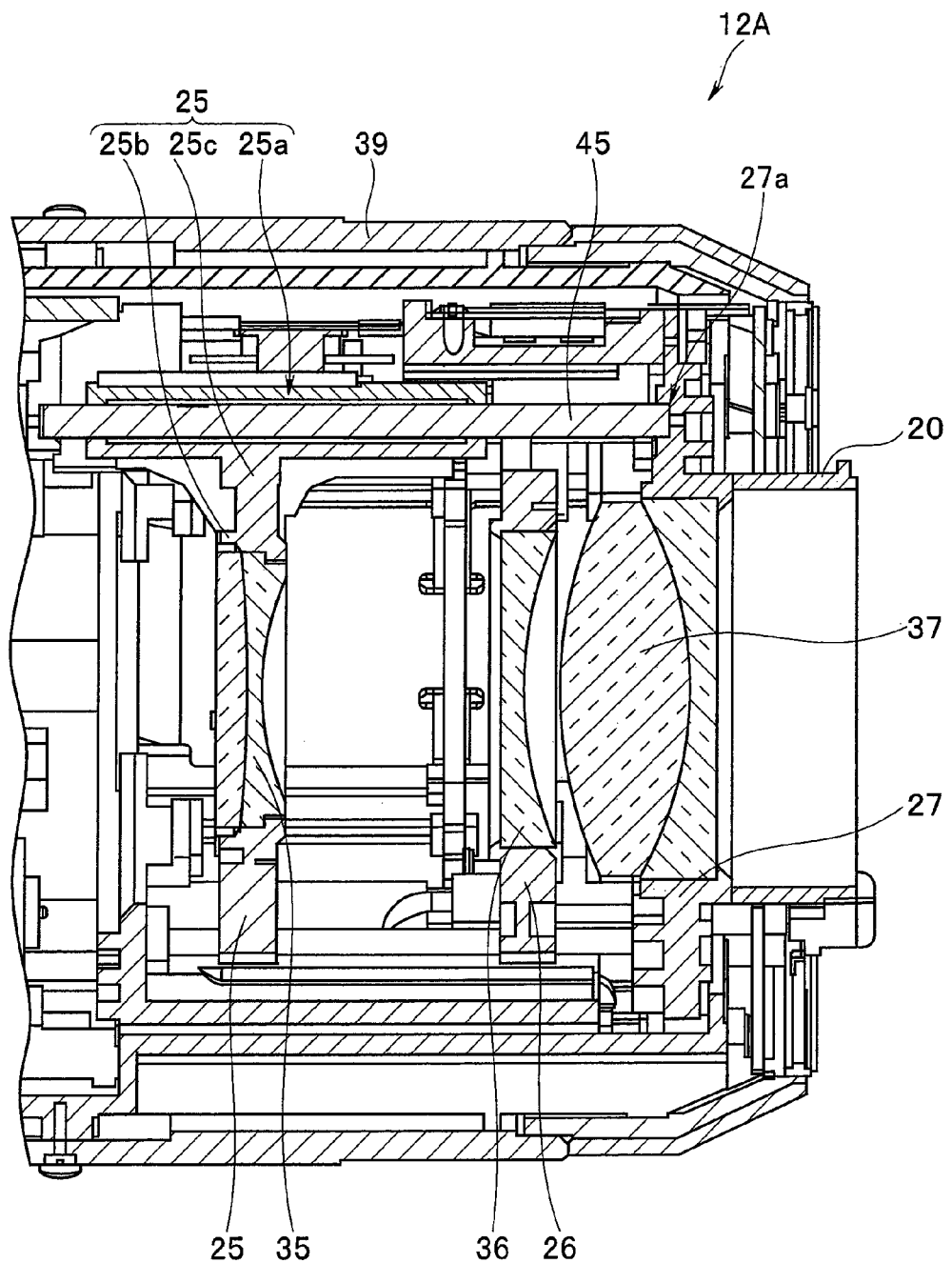
FIG. 7 is a cross-sectional view which illustrates a cross-section including a first guide shaft in the lens drive apparatus according to one embodiment of the present invention, and which is cut along a line [7]-[7] in FIG. 4.
Figure 8:
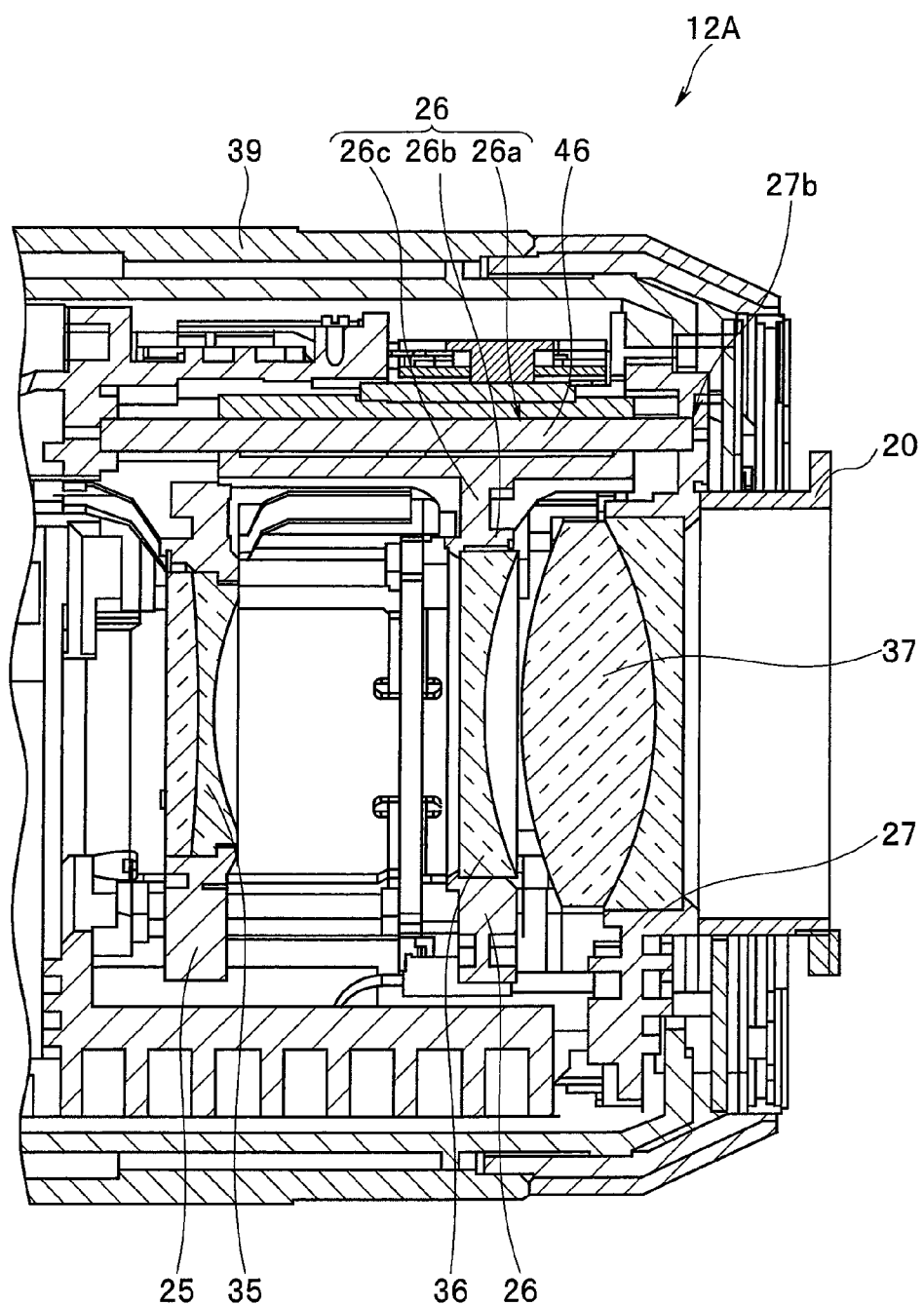
FIG. 8 is a cross-sectional view which illustrates a cross-section including a second guide shaft in the lens drive apparatus according to one embodiment of the present invention, and which is cut along a line [8]-[8] in FIG. 4.
Figure 9:
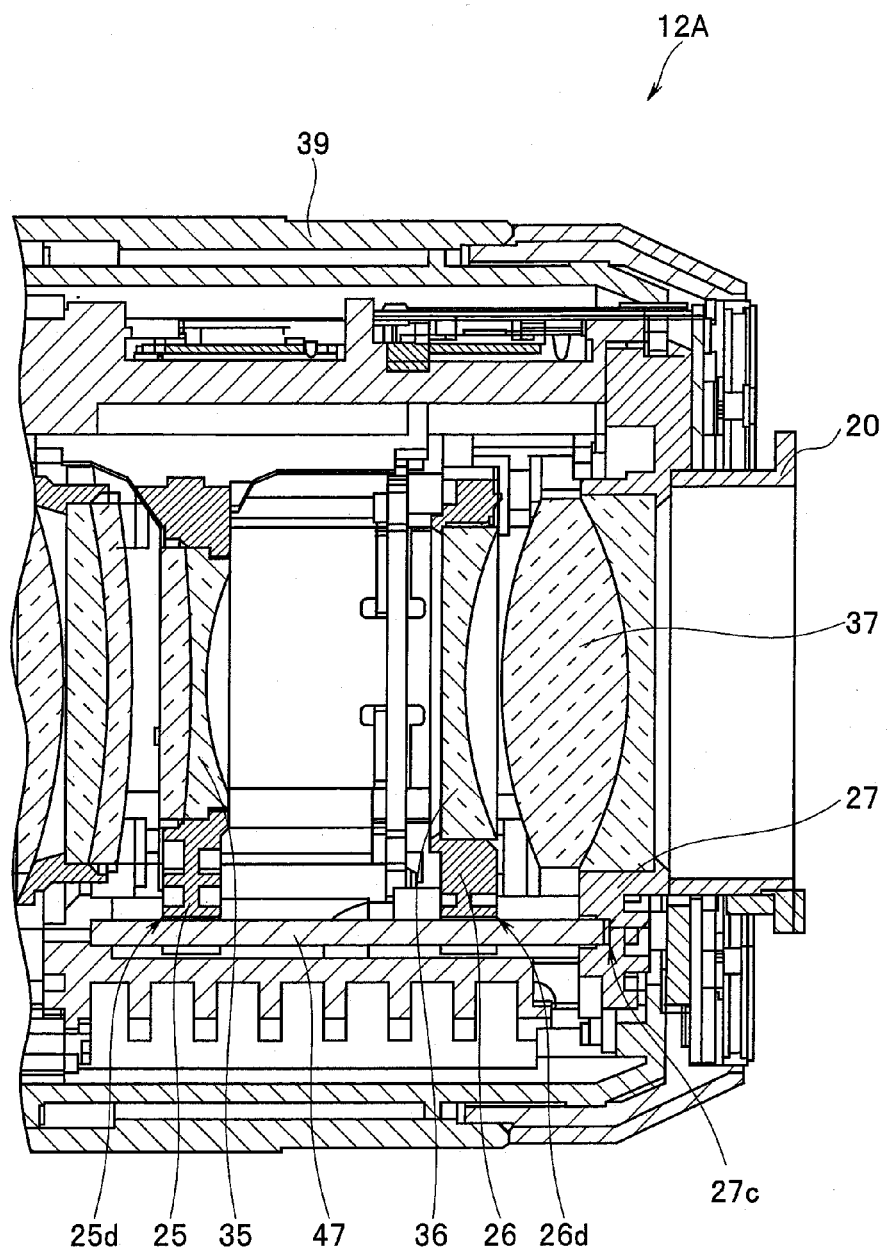
FIG. 9 is a cross-sectional view which illustrates a cross-section including an anti-rotation shaft in the lens drive apparatus according to one embodiment of the present invention, and which is cut along a line [9]-[9] in FIG. 4.

The detailed configuration of the lens drive apparatus according to the present embodiment will be described below. FIG. 4 to FIG. 9 are cross-sectional views illustrating cross-sections near the lens drive apparatus in the lens barrel to which the lens drive apparatus according to the present embodiment is applied. Among these drawings, FIG. 4 illustrates a cross-section of a face which is orthogonal to the optical axis O near the lens drive apparatus according to the present embodiment, and is a cross-sectional view cut along a line [4]-[4] in FIG. 3. FIG. 5 is a cross-sectional view in which part of FIG. 3 is enlarged, and which is a cross-sectional view cut along a line [5]-[5] in FIG. 4. FIG. 6 illustrates a cross-section of a yoke of a voice coil motor mechanism in the lens drive apparatus according to the present embodiment, and is a cross-sectional view cut along a line [6]-[6] in FIG. 4. FIG. 7 illustrates a cross-section including a first guide shaft in the lens drive apparatus according to the present embodiment, and is a cross-sectional view cut along a line [7]-[7] in FIG. 4. FIG. 8 illustrates a cross-section including a second guide shaft in the lens drive apparatus according to the present embodiment, and is a cross-sectional view cut along a line [8]-[8] in FIG. 4. FIG. 9 illustrates a cross-section including an anti-rotation shaft in the lens drive apparatus according to the present embodiment, and is a cross-sectional view cut along a line [9]-[9] in FIG. 4. Note that FIG. 5 to FIG. 9 mainly illustrate the vicinity of the lens drive apparatus arranged backward in the lens barrel and omit the front side of the lens barrel.

Figure 10:
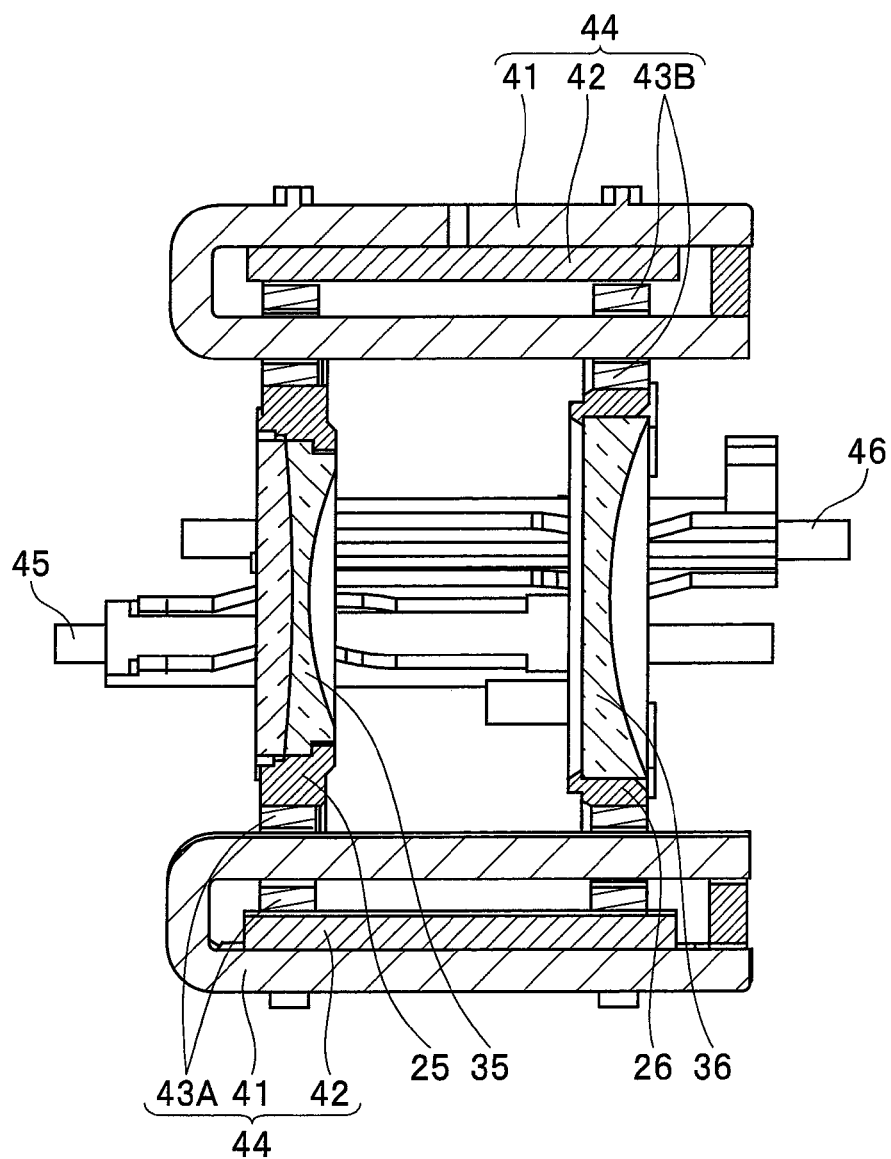
FIG. 10 is a cross-sectional view of main parts which schematically illustrates main component portions of the lens drive apparatus in the lens barrel in FIG. 3.
Figure 11:
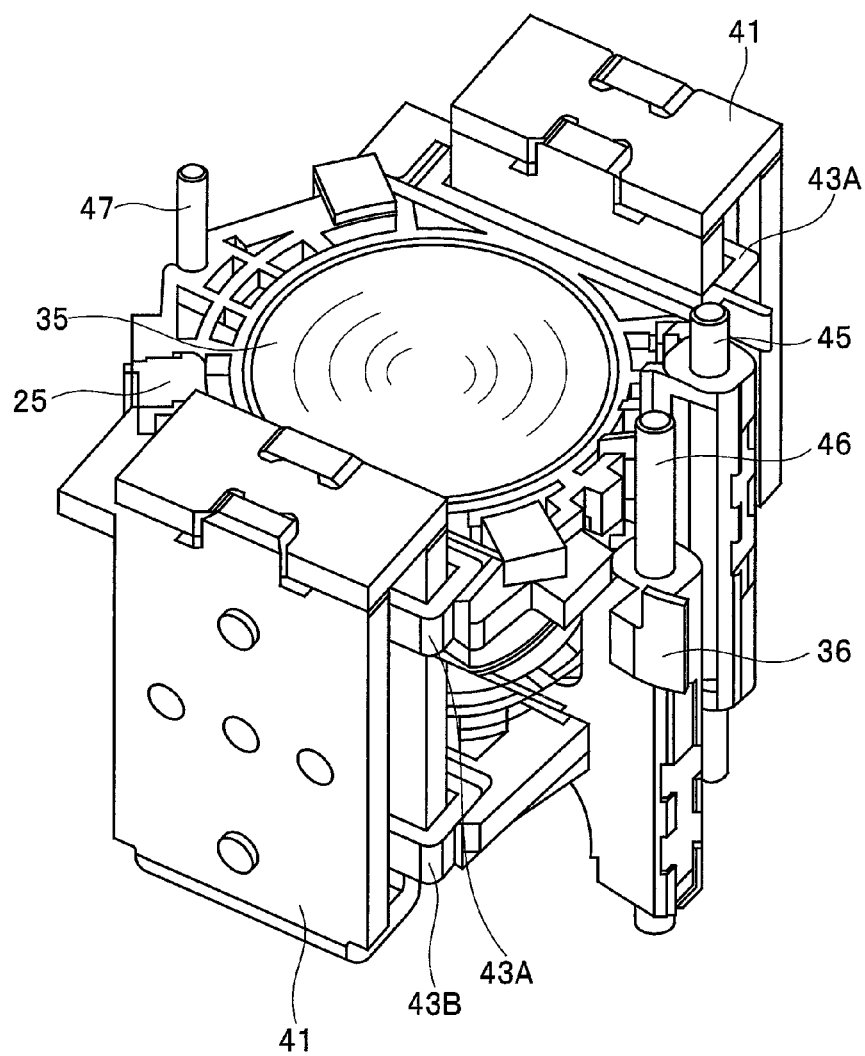
FIG. 11 is a perspective view of main parts which schematically illustrates main component portions of the lens drive apparatus in the lens barrel in FIG. 3.

FIG. 10 is a cross-sectional view of main parts which schematically illustrates main component portions of the lens drive apparatus in the lens barrel in FIG. 3. FIG. 11 is a perspective view of the main parts which schematically illustrates the main component portions of the lens drive apparatus in the lens barrel in FIG. 3.

The lens drive apparatus 40 according to the present embodiment is configured with two movable lens holding members (25, 26), two guide shafts (45, 46) which respectively support the two movable lens holding members (25, 26) so as to be able to freely move in a direction along the optical axis O, an anti-rotation shaft 47 which latches the two movable lens holding members (25, 26) so as not to rotate around the optical axis O, two voice coil motor mechanisms 44 which are driving mechanisms for moving the two movable lens holding members (25, 26) in the direction along the optical axis O, or the like.

In the present embodiment, the above-described two movable lens holding members are the fifth group lens holding frame 25 and the sixth group lens holding frame 26 as described above. The fifth group lens holding frame 25 (the first lens frame) is supported by the first guide shaft 45 so as to be able to freely move in the direction along the optical axis O. Further, the sixth group lens holding frame 26 (the second lens frame) is supported by the second guide shaft 46 so as to be able to freely move in the direction along the optical axis O. Both the fifth group lens holding frame 25 and the sixth group lens holding frame 26 are latched by the anti-rotation shaft 47 so as not to rotate around the optical axis O.

The above-described two guide shafts (45, 46) and the anti-rotation shaft 47 have respective posterior end portions which are fixedly installed at fixed portions (see a reference numeral 27a in FIG. 7, a reference numeral 27b in FIG. 8 and a reference numeral 27c in FIG. 9) of the seventh group lens holding frame 27 which is a fixed lens holding member, and respective anterior end portions which are fixedly installed at predetermined portions of the fixed portion of the fourth group lens holding frame 24 which is the fixed lens holding member. With this configuration, the above-described two guide shafts (45, 46) and the anti-rotation shaft 47 extend between the fixed portions of the seventh group lens holding frame 27 and the fixed portion of the fourth group lens holding frame 24 in parallel to the optical axis O.

As illustrated in FIG. 4, or the like, the two guide shafts (45, 46) are arranged so as to be adjacent to each other in a circumferential direction around the optical axis O in a cross-section perpendicular to the optical axis O. Further, the anti-rotation shaft 47 is arranged at a position rotated for substantially 180 degrees in the circumferential direction around the optical axis O with respect to the positions where the above-described two guide shafts (45, 46) are arranged, that is, at a position opposite to the positions where the guide shafts (45, 46) are arranged.

In contrast to this, the fifth group lens holding frame 25 (the first lens frame) is mainly formed with a holding frame portion 25b in a substantially cylindrical shape which fixedly holds the fifth group lens 35 at substantially the center part, an arm portion 25c which is provided to project in a radial direction from an outer peripheral edge portion of the holding frame portion 25b, a first fitting portion 25a which is fitted with the above-described first guide shaft 45 fixedly installed at a distal end of the arm portion 25c as illustrated in FIG. 7, and an anti-rotation portion 25d which is provided to project in a radial direction of an outer peripheral edge portion of the holding frame portion 25b from a position rotated for substantially 180 degrees in a circumferential direction with respect to the position of the above-described arm portion 25c, and whose cross-section of a distal end portion is substantially U-shaped as illustrated in FIG. 9. As illustrated in FIG. 7, the first fitting portion 25a is a hollow tubular portion formed in parallel to the optical axis O, into which the first guide shaft 45 is inserted and with which the first guide shaft 45 is fitted. Further, as illustrated in FIG. 9, the anti-rotation shaft 47 is inserted into and engages with the anti-rotation portion 25d. This configuration enables the fifth group lens holding frame 25 to freely move in a direction along the optical axis O along the first guide shaft 45 with which the first fitting portion 25a is fitted and to prevent rotation around the optical axis O by the engagement of the anti-rotation shaft 47 with the anti-rotation portion 25d.

Note that in the fifth group lens holding frame 25, a pair of first coils 43A configuring part of the voice coil motor mechanism 44 which will be described later are fixedly installed at predetermined portions of the outer peripheral edge portion of the above-described holding frame portion 25b. That is, as illustrated in FIG. 4, FIG. 6, or the like, the pair of first coils 43A are arranged at positions opposite to each other with the optical axis O therebetween and at the respective portions rotated for approximately 90 degrees in a circumferential direction with respect to the positions of both the arm portion 25c and the anti-rotation portion 25d.

Accordingly, the fifth group lens holding frame 25 which is the first lens frame, has the first coil 43A (a first coil) wound around a second parallel portion 41b of a yoke 41 which will be described later, and is a movable lens holding frame which is guided by the first guide shaft 45 (the first guide shaft).

On the other hand, the sixth group lens holding frame 26 is mainly formed with a holding frame portion 26b in a substantially cylindrical shape which fixedly holds the sixth group lens 36 at substantially the center part, an arm portion 26c which is provided to project in a radial direction from an outer peripheral edge portion of the holding frame portion 25b, a second fitting portion 26a which is fitted with the above-described first guide shaft 46 fixedly installed at a distal end of the arm portion 26c as illustrated in FIG. 8, and an anti-rotation portion 26d which is provided to project in a radial direction from an outer peripheral edge portion of the holding frame portion 26b from a position rotated for substantially 180 degrees in a circumferential direction with respect to the position of the above-described arm portion 26c and whose cross-section of a distal end portion is substantially U-shaped as illustrated in FIG. 9. As illustrate in FIG. 8, the second fitting portion 26a is a hollow tubular portion formed in parallel to the optical axis O, into which the second guide shaft 46 is inserted and with which the second guide shaft 46 is fitted. Further, as illustrated in FIG. 9, the anti-rotation shaft 47 is inserted into and engages with the anti-rotation portion 26d. This configuration enables the sixth group lens holding frame 26 to freely move in a direction along the optical axis O along the second guide shaft 46 with which the second fitting portion 26a is fitted and to prevent rotation around the optical axis O by the engagement of the anti-rotation shaft 47 with the anti-rotation portion 26d.

Note that in the sixth group lens holding frame 26, a pair of second coils 43B configuring part of the voice coil motor mechanism 44 which will be described later are fixedly installed at predetermined portions of the outer peripheral edge portion of the above-described holding frame portion 26b. That is, as illustrated in FIG. 6, or the like, the pair of second coils 43B are arranged at positions opposite to each other with the optical axis O therebetween and at the respective portions rotated for approximately 90 degrees in a circumferential direction with respect to the positions of both the arm portion 26c and the anti-rotation portion 26d.

Accordingly, the sixth group lens holding frame 26 which is the second lens frame, is arranged at a predetermined distance from the above-described fifth group lens holding frame 25 (the first lens frame), has the second coil 43B (a second coil) wound around the second parallel portion 41b of the above-described yoke 41, and is a movable lens holding frame which is guided by the second guide shaft 46 (the second guide shaft).

As described above, in the lens drive apparatus 40 according to the present embodiment, the two guide shafts (45, 46) respectively guide movement of the two movable lens holding members (25, 26) in the optical axis O direction, and one shared anti-rotation shaft 47 prevents the two movable lens holding members (25, 26) from rotating around the optical axis O.

The voice coil motor mechanism 44 is configured with the yoke 41, a magnet 42 and two coils (43A, 43B). Among these, the yoke 41 is, as illustrated in FIG. 6, formed with a magnetic material whose cross-section in the optical axis direction is substantially U-shaped. To be more specific, the yoke 41 has the first parallel portion 41a which is parallel to the optical axis O in a cross-section in the optical axis O direction and the second parallel portion 41b which is located closer to the optical axis O than the first parallel portion 41a in the cross-section in the optical axis O direction and which is parallel to the optical axis O, the first parallel portion 41a and the second parallel portion 41b being magnetically coupled to each other. The yoke 41 is fixedly installed at a yoke fixing portion 39a of a fixing frame 39. Further, the first coil 43A and the second coil 43B are wound around the second parallel portion 41b of the yoke 41.

The magnet 42 which is arranged at an internal face of the first parallel portion 41a of the yoke 41, is formed with a permanent magnet, or the like, and extends in the optical axis O direction so that a cross-section in the optical axis O direction is in parallel to the optical axis O.

In the lens drive apparatus 40 according to the present embodiment, two voice coil motor mechanisms 44 are provided at the positions opposite to each other with the optical axis O therebetween. Each of the voice coil motor mechanisms 44 is formed so that the yoke 41 and the magnet 42 cover a movable range of the two movable lens holding members (25, 26), and the respective coils (43A, 43B) fixedly installed at the respective lens holding member (25, 26) are inserted into and arranged at the yoke 41. Accordingly, the yoke 41 and the magnet 42 are configured to be shared between the two movable lens holding members (25, 26).

The two guide shafts (45, 46) are arranged at positions so as not to interfere with the above-described yoke 41 in cross-sections (see FIG. 4) perpendicular to the optical axis O.

The lens drive apparatus according to the present embodiment configured as described above is schematically illustrated in FIG. 12. That is, FIG. 12 is a conceptual diagram simply illustrating the configuration of the lens drive apparatus according to one embodiment of the present invention.

Figure 12:
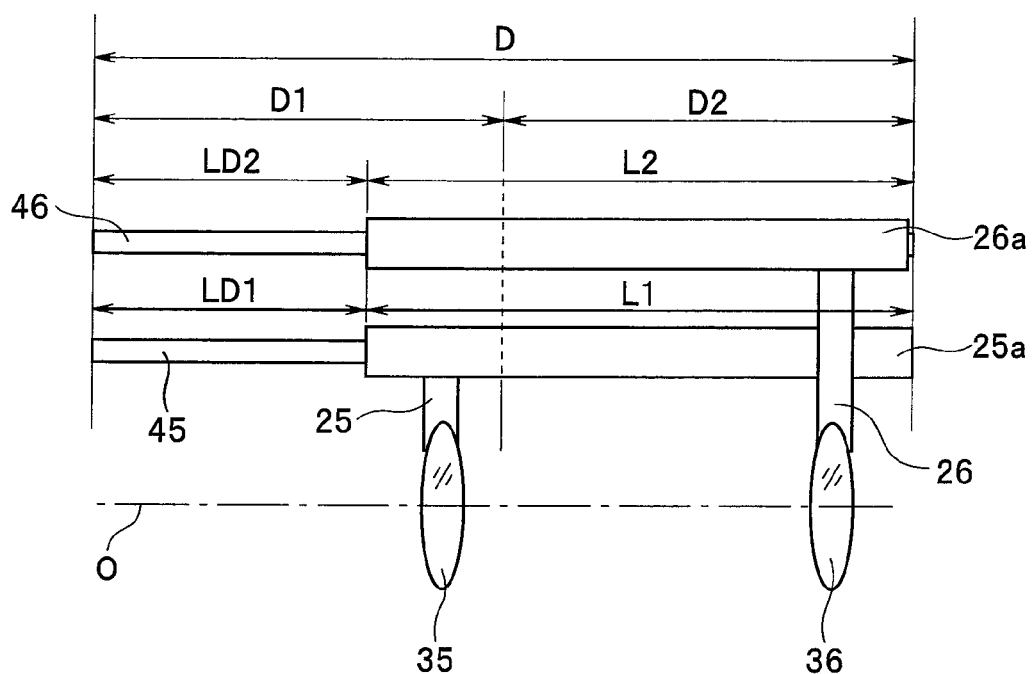
FIG. 12 is a conceptual view simply illustrating a configuration of the lens drive apparatus according to one embodiment of the present invention.

In FIG. 12, a reference code D indicates a shaft length of the two guide shafts (45, 46), that is, an entire region where the two movable lens holding members (25, 26) which respectively hold the focus lens groups in the photographing optical system are supported in the lens barrel 12A.

In the same FIG. 12, a reference code D1 indicates a range where the fifth group lens 35 held by the fifth group lens holding frame 25 among the two movable lens holding members (25, 26) moves forward and backward in the optical axis O direction. Further, in the same FIG. 12, a reference code D2 indicates a range where the sixth group lens 36 held by the sixth group lens holding frame 26 among the two movable lens holding members (25, 26) moves forward and backward in the optical axis O direction.

In the same FIG. 12, a reference code LD1 indicates a drive amount required for the fifth group lens holding frame 25 to move forward and backward in the optical axis O direction. In the same FIG. 12, a reference code LD2 indicates a drive amount required for the sixth group lens holding frame 26 to move forward and backward in the optical axis O direction.

Note that a reference code L1 in FIG. 12 indicates a fitting length of the first fitting portion 25a of the fifth group lens holding frame 25, and a reference code L2 in FIG. 12 indicates a fitting length of the second fitting portion 26a of the sixth group lens holding frame 26.

The lens drive apparatus 40 according to the present embodiment is configured to respectively move the two movable lens holding members (25, 26) forward and backward in a direction along the optical axis O using the pair of voice coil motor mechanisms 44. In this case, the two movable lens holding members (25, 26) are configured to be respectively supported using the two guide shafts (45, 46).

With this configuration, it is possible to sufficiently ensure the respective fitting lengths (L1, L2), while ensuring the drive amounts (LD1, LD2) respectively required by the two movable lens holding members (25, 26).

For example, the fitting length of the first fitting portion 25a of the fifth group lens holding frame 25 (the first lens frame) fitted with the first guide shaft 45 and the fitting length of the second fitting portion 26a of the sixth group lens holding frame 26 (the second lens frame) fitted with the second guide shaft 46 are set so as to be longer than a shortest distance when the above-described two movable lens holding members (25, 26) come closest to each other.

As described above, according to the above-described first embodiment, in the lens drive apparatus 40 which moves the two movable lens holding members (25, 26) forward and backward in the optical axis direction using the pair of voice coil motor mechanisms 44, the two guide shafts (45, 46) are used to support the two movable lens holding members (25, 26) to be able to freely move forward and backward in the optical axis direction. With this configuration, because it is possible to sufficiently ensure the fitting lengths (L1, L2) of the respective fitting portions (25a, 26a) of the two movable lens holding members (25, 26), it is possible to prevent the two movable lens holding members (25, 26) from being inclined, so that it is possible to maintain favorable optical performance in the overall photographing optical system. At the same time, it is possible to ensure smooth movement of the respective movable lens holding frames (25, 26) in the optical axis direction.

On the one hand, one anti-rotation shaft 47 is configured so as to be shared between the two movable lens holding members (25, 26). Further, also in the configuration of the voice coil motor mechanisms 44, the yoke 41 and the magnet 42 are shared. This configuration enables reduction of the number of parts, which contributes to downsizing of the lens drive apparatus, and can further contribute to space saving of internal space of the lens barrel to which the lens drive apparatus is applied.

On the other hand, the pair of voice coil motor mechanisms 44 are arranged at positions rotated for approximately 90 degrees in a circumferential direction around the optical axis O with respect to the arrangement positions of the respective fitting portions (25a, 26a) of the two movable lens holding members (25, 26) or the respective anti-rotation portions (25d, 26d). In other words, a line connecting substantially the center portion of the pair of yoke 41 is set so as to be substantially orthogonal to a line connecting the optical axis O from the vicinity of the positions where the two guide shafts (45, 46) are arranged or a line connecting the anti-rotation shaft 47 and the optical axis O. This arrangement enables the voice coil motor mechanisms 44 to be arranged in a balanced manner, and eliminates a case where the two movable lens holding members (25, 26) supported by the respective fitting portions (25a, 26a) are arranged while being inclined with respect to the optical axis O. Accordingly, the two movable lens holding members (25, 26) can be configured so as to be able to smoothly move forward and backward in a direction along the optical axis O.

Note that the present embodiment employs a configuration where the two guide shafts (45, 46) are used to respectively support the two movable lens holding members (25, 26). In this configuration, while there is an angle in the circumferential direction between the two guide shafts (45, 46), by arranging the two guide shafts at positions as close as possible to each other so that the angle in the circumferential direction between the two guide shafts becomes as small as possible, even if the above setting is employed for the positions where the voice coil motor mechanisms 44 are arranged, the voice coil motor mechanisms 44 can be arranged in a balanced manner.

Further, the present invention is not limited to the above-described embodiment, and, of course, various modification and application can be applied within a range which does not deviate from the spirit of the invention. Further, the above-described embodiment includes inventions in various phases, and various inventions can be derived according to appropriate combinations of a plurality of disclosed components. For example, even if some components are deleted from all the components described in the above-described embodiment, if the problem to be solved by the invention can be solved and the advantageous effect of the invention can be obtained, a configuration in which the components are deleted can be derived as an invention, which is not restricted by particular aspects other than being limited by attached claims.

What is claimed is:

1. A lens drive apparatus comprising:
a first U-shaped yoke which has a first parallel portion which is parallel to an optical axis and a second parallel portion which is parallel to the optical axis and which is located closer to the optical axis than the first parallel portion in a cross-section in an optical axis direction;
a second U-shaped yoke which has a first parallel portion which is parallel to the optical axis and a second parallel portion which is parallel to the optical axis and which is located closer to the optical axis than the first parallel portion in the cross-section in the optical axis direction, wherein the second U-shaped yoke is arranged so as to be opposed to the first U-shaped yoke across the optical axis;
a first magnet which is arranged at the first parallel portion of the first U-shaped yoke and which extends in the optical axis direction parallel to the optical axis;
a second magnet which is arranged at the first parallel portion of the second U-shaped yoke and which extends in the optical axis direction parallel to the optical axis;
a first lens frame which has a first coil wound around the second parallel portion of the first U-shaped yoke and a second coil wound around the second parallel portion of the second U-shaped yoke;
a second lens frame which is arranged at a predetermined distance from the first lens frame, and which has a third coil wound around the second parallel portion of the first U-shaped yoke and a fourth coil wound around the second parallel portion of the second U-shaped yoke,
a first guide shaft which guides the first lens frame, wherein, in a cross-section perpendicular to the optical axis direction, the first guide shaft is arranged at a first position rotated by approximately 90 degrees in a circumferential direction with respect to the first U-shaped yoke and the second U-shaped yoke;
a second guide shaft which guides the second lens frame, wherein, in the cross-section perpendicular to the optical axis, the second guide shaft is arranged adjacent to the first guide shaft at a second position rotated by approximately 90 degrees in the circumferential direction with respect to the first U-shaped yoke and the second U-shaped yoke; and
an anti-rotation shaft which prevents rotation of the first lens frame and the second lens frame around the optical axis, wherein, in the cross-section perpendicular to the optical axis, the anti-rotation shaft is arranged at a position opposed to the first guide shaft and the second guide shaft;
wherein:
the first lens frame is movable along the second parallel portions of the first and second U-shaped yokes by means of the first and second coils and the first and second magnets, while being supported by the first guide shaft and the anti-rotation shaft,
the second lens frame is movable along the second parallel portions of the first and second U-shaped yokes by means of the third and fourth coils and the first and second magnets, while being supported by the second guide shaft and the anti-rotation shaft, and
a fitting length of a fitting portion of the first lens frame fitted with the first guide shaft is longer than a shortest distance between the first lens frame and the second lens frame when the first lens frame and the second lens frame come closest to each other, and a fitting length of a fitting portion of the second lens frame fitted with the second guide shaft is longer than the shortest distance between the first lens frame and the second lens frame when the first lens frame and the second lens frame come closest to each other.

2. The lens drive apparatus according to claim 1, wherein the first U-shaped yoke and the second U-shaped yoke are U-shaped in the cross-section in the optical axis direction.

3. The lens drive apparatus according to claim 1, further comprising:
a first voice coil motor mechanism which includes the first U-shaped yoke, the first magnet, the first coil, and the third coil, and
a second voice coil mechanism which includes the second U-shaped yoke, the second magnet, the second coil, and the fourth coil,
wherein the first voice coil motor mechanism and the second voice coil motor mechanism are arranged to face the optical axis.

4. A lens barrel comprising the lens drive apparatus according to claim 1.

5. An image pickup apparatus comprising:
the lens drive apparatus according to claim 1; and
an image pickup portion which comprises an image pickup device that receives a light of an optical image of an object formed through a photographing optical system and performs photoelectric conversion to generate image data.

* * * * *